(12) United States Patent
Zinner et al.

(10) Patent No.: US 10,953,878 B2
(45) Date of Patent: Mar. 23, 2021

(54) METHOD FOR THE AUTONOMOUS DRIVING OF A VEHICLE IN A NARROW PASSAGE

(71) Applicant: Continental Automotive GmbH, Hannover (DE)

(72) Inventors: Helge Zinner, Regensburg (DE); Christoph Arndt, Loiching (DE)

(73) Assignee: Continental Automotive GmbH, Hannover (DE)

( * ) Notice: Subject to any disclaimer, the term of this patent is extended or adjusted under 35 U.S.C. 154(b) by 175 days.

(21) Appl. No.: 16/312,004

(22) PCT Filed: Jun. 1, 2017

(86) PCT No.: PCT/DE2017/200047
§ 371 (c)(1),
(2) Date: Dec. 20, 2018

(87) PCT Pub. No.: WO2017/220091
PCT Pub. Date: Dec. 28, 2017

(65) Prior Publication Data
US 2019/0375410 A1   Dec. 12, 2019

(30) Foreign Application Priority Data

Jun. 22, 2016 (DE) .................... 10 2016 211 139.6

(51) Int. Cl.
*B60W 30/18* (2012.01)
*B60W 40/04* (2006.01)
(Continued)

(52) U.S. Cl.
CPC ...... *B60W 30/18009* (2013.01); *B60W 40/04* (2013.01); *B60W 40/06* (2013.01);
(Continued)

(58) Field of Classification Search
CPC ......... B60W 30/18009; B60W 30/095; B60W 40/04; B60W 40/06; B60W 60/00274;
(Continued)

(56) References Cited

U.S. PATENT DOCUMENTS

| 7,259,660 B2 | 8/2007 | Ewerhart et al. |
| 9,308,916 B2 | 4/2016 | Buerkle et al. |

(Continued)

FOREIGN PATENT DOCUMENTS

| DE | 102004015749 | 12/2004 |
| DE | 102012215093 | 2/2014 |

(Continued)

OTHER PUBLICATIONS

Michalke et al.; "The Narrow Road Assistant- Evolution Towards Highly Automated Driving in Inner City"; 2016 IEEE Intelligent Vehicles Sym. (IV), Gothenburg, Sweden, Jun. 19-22, 2016 (Year: 2016).*

(Continued)

*Primary Examiner* — Michael J Zanelli
(74) *Attorney, Agent, or Firm* — W. F. Fasse

(57) ABSTRACT

In a method of autonomously driving a subject vehicle through a narrow passage, the passage and an oncoming vehicle in the passage are sensed by sensors of the subject vehicle, and the speed of the oncoming vehicle is determined from speed data of the sensors. A reaction of the oncoming vehicle is predicted from the determined speed, and the subject vehicle is autonomously moved through the narrow passage when the predicted reaction indicates that the oncoming vehicle will not pass through or will free the narrow passage, or a right-of-way rule stored in a database accessed by the subject vehicle indicates that the subject vehicle has the right of way.

13 Claims, 5 Drawing Sheets

Figure 3:
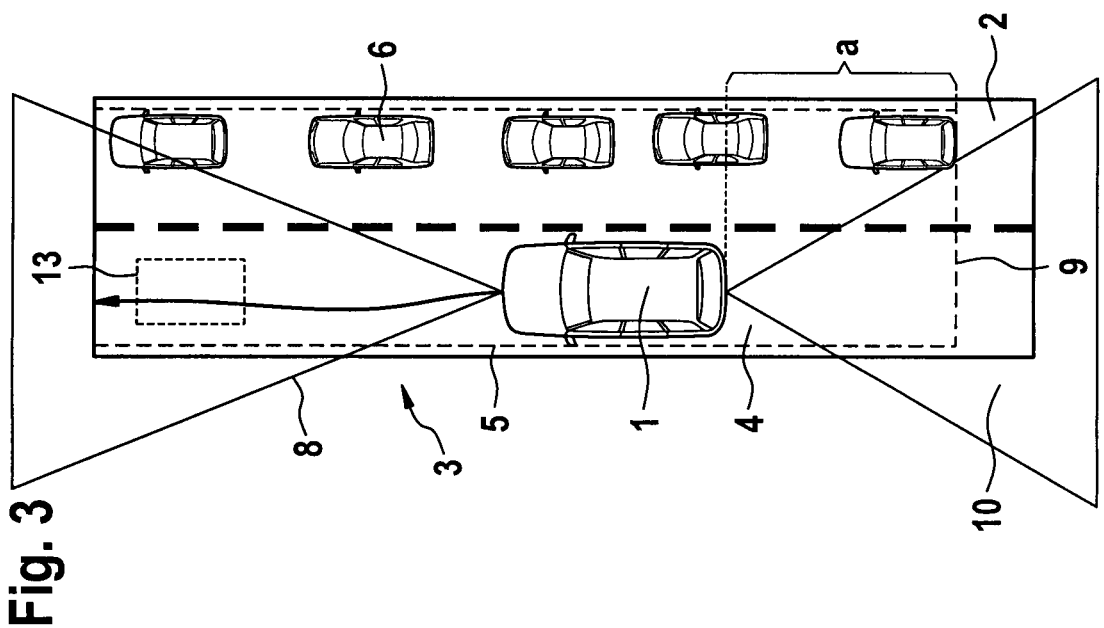

(51) Int. Cl.
  *B60W 40/06* (2012.01)
  *G05D 1/00* (2006.01)
  *G08G 1/01* (2006.01)

(52) U.S. Cl.
  CPC ......... *G05D 1/0088* (2013.01); *G08G 1/0137* (2013.01); *B60W 2552/00* (2020.02); *B60W 2554/80* (2020.02); *G05D 2201/0213* (2013.01)

(58) Field of Classification Search
  CPC ....... B60W 60/00272; B60W 2555/60; B60W 50/0097; G05D 1/0088; G08G 1/0137
  See application file for complete search history.

(56) References Cited

U.S. PATENT DOCUMENTS

| | | | |
|---|---|---|---|
| 2017/0278390 | A1 | 9/2017 | Zydek et al. |
| 2018/0118264 | A1* | 5/2018 | Adiprasito ........... B62D 15/025 |

FOREIGN PATENT DOCUMENTS

| | | |
|---|---|---|
| DE | 102014007030 | 11/2015 |
| DE | 102015219467 | 4/2016 |
| DE | 102014223744 | 5/2016 |
| EP | 1 475 765 | 11/2004 |

OTHER PUBLICATIONS

English translation of the International Search Report of the International Searching Authority for International Application PCT/DE2017/200047, dated Aug. 10, 2017, 3 pages, European Patent Office, HV Rijswijk, Netherlands.

PCT International Preliminary Report on Patentability including English Translation of PCT Written Opinion of the International Searching Authority for International Application PCT/DE2017/200047, dated Dec. 25, 2018, 7 pages, International Bureau of WIPO, Geneva, Switzerland.

German Search Report for German Patent Application No. 10 2016 211 139.6, dated Jan. 10, 2017, 8 pages, German Patent and Trademark Office, Muenchen, Germany, with English translation, 7 pages.

Hyunjin Kim et al., "User-Centered Approach to Path Planning of Cleaning Robots: Analyzing User's Cleaning Behavior", ACM HRI '07, Mar. 8-11, 2007, Arlington VA USA, XP040057714, pp. 373 to 380.

* cited by examiner

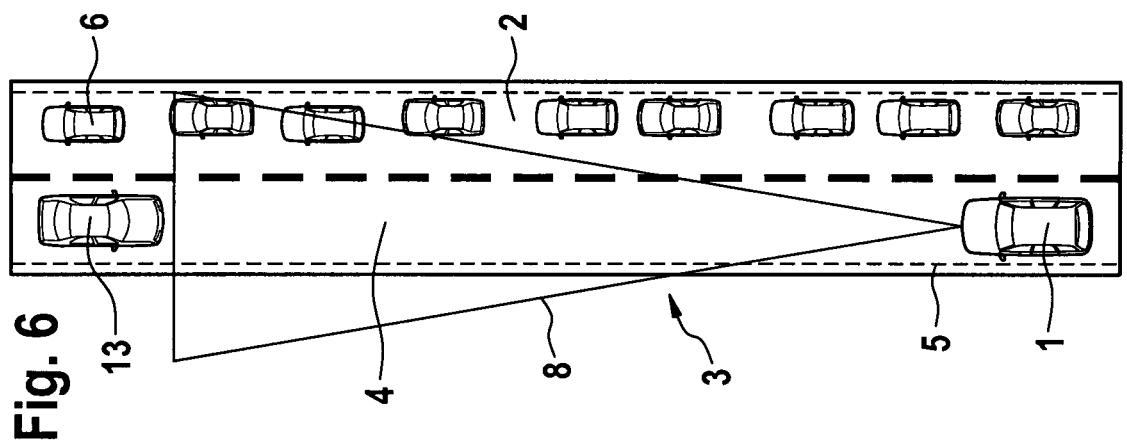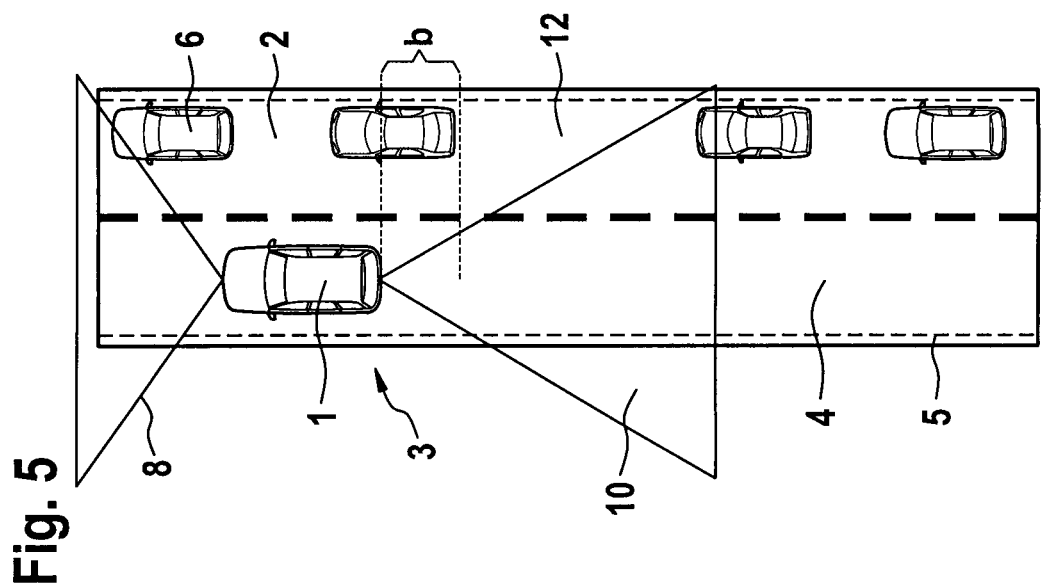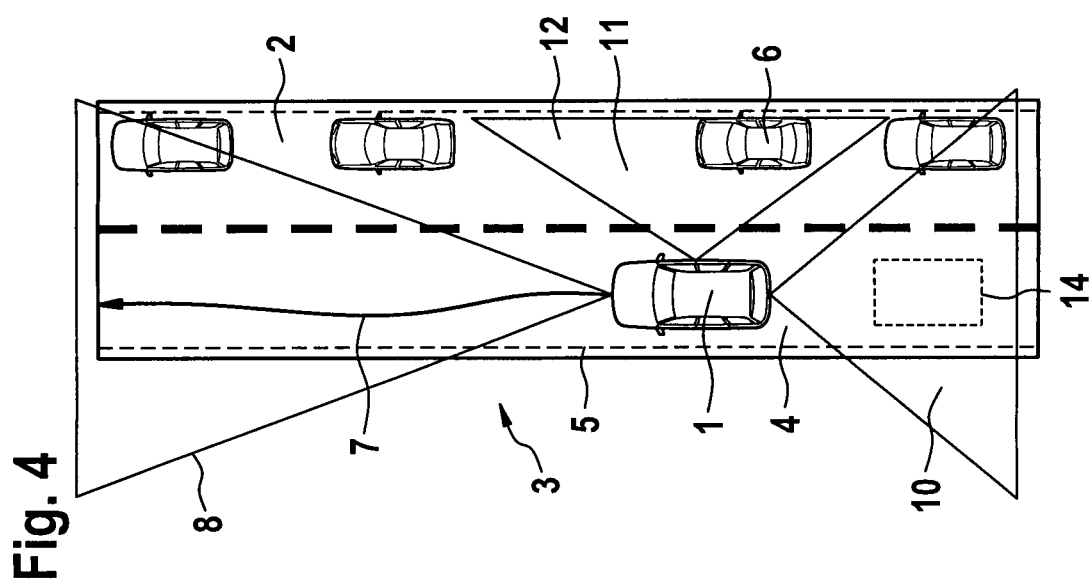

METHOD FOR THE AUTONOMOUS DRIVING OF A VEHICLE IN A NARROW PASSAGE

FIELD OF THE INVENTION

The invention relates to a method for autonomous or respectively automated driving in a narrow passage and for resolving conflict situations in such a narrow passage.

BACKGROUND INFORMATION

The highly automated driving of vehicles has to overcome challenges of many kinds on country roads and in city traffic. Such challenges are in particular traffic circles, narrow passages in main through-roads having approaching vehicles, cyclists on the road, turning maneuvers, double-parked vehicles or vehicles parked half on the roadway, red traffic lights, "right before left" rights of way, crossing pedestrians or streetcars.

In particular, the present invention deals with roads having oncoming traffic, which are permanently narrow. In particular, the term "permanently" can, in connection with this, denote that the width of the road having the narrow passage does not change when the location is passed through by the vehicle or respectively by a vehicle approaching the vehicle.

If two vehicles are approaching one another within the narrow passage or are approaching one another before the two vehicles enter the narrow passage at two opposite ends thereof, wherein at least one of the vehicles can be driven or respectively moved autonomously, this creates the problem as to which of the vehicles is to pass through the narrow passage first without a congestion situation arising. This problem cannot be solved solely with sensors (seeing and monitoring), but likewise requires artificial intelligence. Furthermore, traffic regulations, which can in particular regulate the conduct or respectively the right of way in the case of a narrow passage, are to be complied with.

SUMMARY OF THE INVENTION

One object of the present invention therefore consists of providing a method of the type indicated above, with which a vehicle driving in a highly automated manner or respectively autonomously can pass through narrow passages, while complying with traffic rules and resolving a congestion situation.

The above object can be achieved by a method, a driver assistance system and a vehicle, according to the invention as set forth herein.

The method according to the invention for the autonomous driving of a vehicle through a narrow passage comprises the method steps of:
storing a right-of-way rule for the narrow passage in a database, which the vehicle can access,
sensing the narrow passage and an oncoming vehicle approaching in the region of the narrow passage by means of sensors of the vehicle,
determining the speed and optionally the acceleration of the oncoming vehicle by means of speed data sensed by the sensors and—if determined—acceleration data,
predicting a reaction of the oncoming vehicle in accordance with the determined speed and—if determined—the acceleration of the oncoming vehicle, and
moving the vehicle through the narrow passage, provided that the prediction of the reaction of the oncoming vehicle indicates that the oncoming vehicle will not pass through the narrow passage or frees the narrow passage for passage or
the right-of-way rule stored in the database provides that the vehicle has the right of way in the narrow passage.

The autonomous driving of the vehicle can, in this case, be controlled in particular by a driver assistance system of the vehicle. Furthermore, the term "narrow passage" can denote a restricted piece of a road which is otherwise sufficiently wide for two approaching vehicles to meet, wherein an obstacle, e.g. multiple vehicles parked behind one another, can only be driven past on the left (or respectively on the right in countries where vehicles drive on the left) and no room is left for unhindered oncoming traffic. The method is particularly suited to narrow passages which are relatively long, e.g. roads in residential areas, which are restricted by parked cars to a lane width of only one car for several hundred meters.

In connection with the present invention, the term "autonomously" can in particular additionally denote that driving maneuvers of the vehicle can be independently executed by the vehicle, without requiring intervention on the part of the driver of the vehicle. The vehicle and the oncoming vehicle are, for example, a motor vehicle such as an automobile, car, bus or truck. At least the vehicle is set up to autonomously pass through the narrow passage, wherein the approaching vehicle can likewise be set up to do so. The approaching vehicle can consequently also be a vehicle which does not drive or which cannot be driven autonomously. The vehicle and the oncoming vehicle can also be identical.

The right-of-way rule stored in the database can, for example, be inferred from a corresponding statutory regulation of the respective country in which the narrow passage or respectively the vehicle is currently located. The database can, for example, be part of a navigation system of the vehicle, which is connected to a driver assistance system of the vehicle. The driver assistance system can be set up to carry out the method according to the invention. The right-of-way rule can e.g. include the fact that the vehicle has to wait for the oncoming vehicle, provided that an obstacle causing the narrow passage, e.g. a vehicle parked on the lane, is located on a traffic lane or respectively on one side of the vehicle, and that the vehicle has the right of way with respect to the oncoming vehicle, provided that the obstacle causing the narrow passage is located on the traffic lane or respectively the side of the oncoming vehicle. In addition to the actual right-of-way rule, the latter can also include further traffic rules of involved vehicles within a narrow passage, e.g. that the vehicle should no longer be accelerated in the region of a narrow passage when oncoming traffic is detected, and that caution, attentiveness as well as mutual consideration are to be ensured.

After a narrow passage on the vehicle's own lane and an approaching vehicle have been detected, the vehicle can stop before the narrow passage (with visual contact of the narrow passage), wait there and in particular monitor the narrow passage and the approaching vehicle. In other words, it can be specified in accordance with the determined speed of the approaching vehicle and the right-of-way rule stored in the database whether the vehicle passes through the narrow passage before the approaching vehicle, or whether the vehicle does not pass through the narrow passage and waits until the approaching vehicle has passed through the narrow passage. Thanks to the method according to the invention, a right of way is negotiated with the approaching oncoming vehicle without further communication, wherein road traffic law is complied with and the safety of the occupants is increased. In particular, the method according to the invention makes possible a "chauffeur" function, in accordance with which the vehicle without occupants can e.g. collect a fellow passenger from a residential area having a narrow passage. Furthermore, the vehicle can chauffeur a driver, who does not wish to pay heed to the traffic, through a residential area having a narrow passage.

Provided that an oncoming vehicle has been detected, one embodiment of the method additionally comprises the following method steps of:

determining and saving a position of a start of the narrow passage, establishing a current position of the vehicle within the narrow passage, establishing the clearance of the current position from the position of the start of the narrow passage, sensing by means of the sensors whether at least one following vehicle is located behind the vehicle, wherein the following vehicle prevents the vehicle reversing out of the narrow passage, and moving the vehicle out of the narrow passage in the backward direction of the vehicle, if the prediction of the reaction of the oncoming vehicle indicates that the oncoming vehicle will pass through the narrow passage or does not free the narrow passage for passage or the right-of-way rule stored in the database provides that the vehicle does not have the right of way in the narrow passage, and no following vehicle has been sensed behind the vehicle.

If the vehicle ascertains that the oncoming vehicle has the right of way or does not free the narrow passage, the vehicle reverses out of the narrow passage, in order to free the narrow passage to allow the oncoming vehicle to drive through. The start of the narrow passage or respectively the region in front thereof consequently serves as an avoiding/stopping position for the vehicle if oncoming traffic having the right of way is detected, or respectively in the case of oncoming traffic which is behaving as if it had the right of way and is blocking the thoroughfare for the vehicle. However, the vehicle only reverses to said avoiding/stopping position if it has determined that the rear region behind the vehicle is free, i.e. that no following vehicle is located in this region or will be located therein during the reversing. Therefore, the following vehicle does not necessarily have to be within the narrow passage yet. The vehicle can also establish by means of its sensors whether a detected following vehicle, which is not yet located within the narrow passage, is likely to drive into this and will block the vehicle exiting from the narrow passage in the backward direction.

According to another embodiment, the following additional method steps are provided in the case of a detected oncoming vehicle:

sensing of a stopping place or respectively avoiding position, e.g. a parking space, within the narrow passage by means of the sensors during the movement of the vehicle through the narrow passage, wherein the stopping place is sufficiently large for parking the vehicle, determining and saving of a position of the sensed stopping place, sensing by means of the sensors whether at least one following vehicle is located behind the vehicle, wherein the following vehicle prevents the vehicle reversing out of the narrow passage, and parking of the vehicle in the stopping place, if the prediction of the reaction of the oncoming vehicle indicates that the oncoming vehicle will pass through the narrow passage or does not free the narrow passage for passage or the right-of-way rule stored in the database provides that the vehicle does not have the right of way in the narrow passage.

Provided that the vehicle ascertains that the oncoming vehicle has the right of way or does not free the narrow passage and reversing out of the narrow passage is blocked by following vehicles, the vehicle can according to this embodiment determine alternative avoiding/stopping positions, e.g. in the form of parking spaces, within the narrow passage. The invention or respectively embodiments thereof is/are explained predominantly below—without being limited thereto—with reference to the example of a parking space as an avoiding/stopping place. Provided that a sufficiently large parking space has been determined, the vehicle can park in the parking space and consequently the narrow passage is freed for the oncoming vehicle to drive through. Provided that the vehicle as described above has determined a sufficiently large parking space, but has not already driven past this, it can also—provided that no following vehicle has been sensed behind the vehicle, which is blocking parking in the parking space—reverse into the parking space. Furthermore, the vehicle can also continually look for parking spaces regardless of whether or not it is possible to reverse out of the narrow passage.

According to another embodiment, a parameter of a complexity of a traffic situation is established in the region of the narrow passage, provided that the determination of the speed of the oncoming vehicle indicates that the oncoming vehicle is stationary. A range of values is specified in accordance with the established parameter, which defines a maximum elapsed time of a timer in seconds and a number of seconds is randomly selected from the range of values, wherein the timer runs down in accordance with the selected number of seconds. The vehicle is moved autonomously within the narrow passage in the forward direction of the vehicle after the timer has run down, and it is checked by means of the sensors whether the narrow passage can be passed through by the vehicle. This embodiment helps to resolve a congestion situation, while complying with relevant parameters. In this case, the aim is for the vehicle to reproduce human behavior which makes a decision based on the situation (e.g. there is still a truck behind me, there is a difficult passage behind me, meaning that it will only be possible to reverse with difficulty, etc.), in order to also be able to share the road in a particularly safe manner with non-autonomously driving vehicles.

The complexity of the traffic situation in the region of the narrow passage can be particularly advantageously determined, e.g. on the basis of the criteria described below. On the one hand, it can be influential whether a following vehicle is located behind the vehicle. If so, this can result in a relatively low upper limit of the range of values. If not, the upper limit of the range of values can be selected to be correspondingly higher. On the other hand, it can be determined how many following vehicles are located behind the vehicle. The higher the number of following vehicles is, the lower the upper limit of the range of values that can be selected is. Furthermore, the existence of a possibility for the vehicle to park within the narrow passage can result in a higher upper limit of the range of values, whereas the non-existence of a stopping/avoiding position, e.g. of a parking space, for the vehicle within the narrow passage can result in a correspondingly lower upper limit of the range of values. Additionally, the type of vehicles following the vehicle can influence the determination of the complexity of the traffic situation, in that e.g. in the case of a bus, a truck, a vehicle with a new driver and a police vehicle, the upper threshold of the range of values can be selected to be relatively low depending on the category. In addition, it can be determined how complex the narrow passage has been up to that point, e.g. whether the traffic guidance has bends or a brow of a hill. In the case of a correspondingly difficult or respectively complex route, the upper limit of the range of values can be selected to be correspondingly low.

Furthermore, the method according to the present invention can be implemented both with the vehicle and with the oncoming vehicle. In this case, the range of values can be increased by at least one second, provided that the determination of the speed of the oncoming vehicle and of the vehicle by means of speed data sensed by the sensors indicates that the vehicle and the oncoming vehicle are stationary or the vehicle and the oncoming vehicle are driving in their respective forward directions. By increasing the timer elapsed time, the probability is reduced that the vehicle and the oncoming vehicle will start again at the same time.

According to another embodiment, the established parameter of the complexity of the traffic situation is established in the region of the narrow passage and it is determined whether the traffic situation makes it difficult for the vehicle to continue driving in its forward direction or in its backward direction. Provided that this is the case, the upper limit of the range of values is increased. If this is not the case, the upper limit of the range of values is lowered. This embodiment is explained in greater detail in connection with FIG. 9 of the drawing and makes it possible, by changing the range of values (increasing or respectively lowering the upper limit of the range of values), to prevent permanent congestion situations.

Furthermore, a driver assistance system for the vehicle and the oncoming vehicle can be set up to execute the method according to the present invention. In addition, the vehicle and the oncoming vehicle can comprise the driver assistance system.

Figure 2:
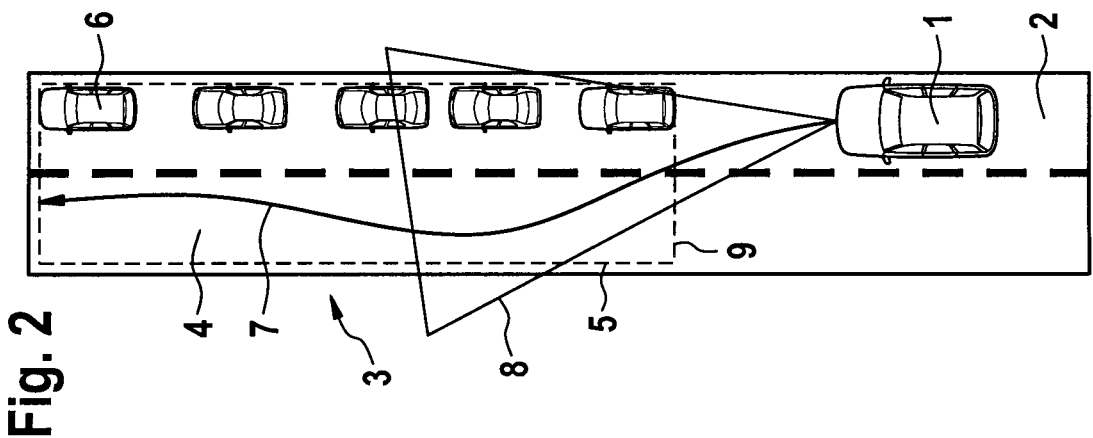
Figure 1:
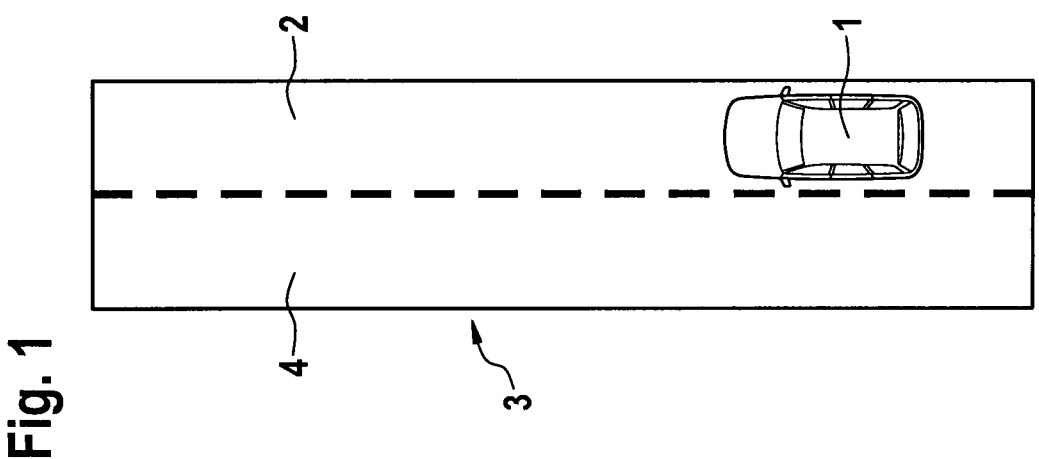
Figure 7:
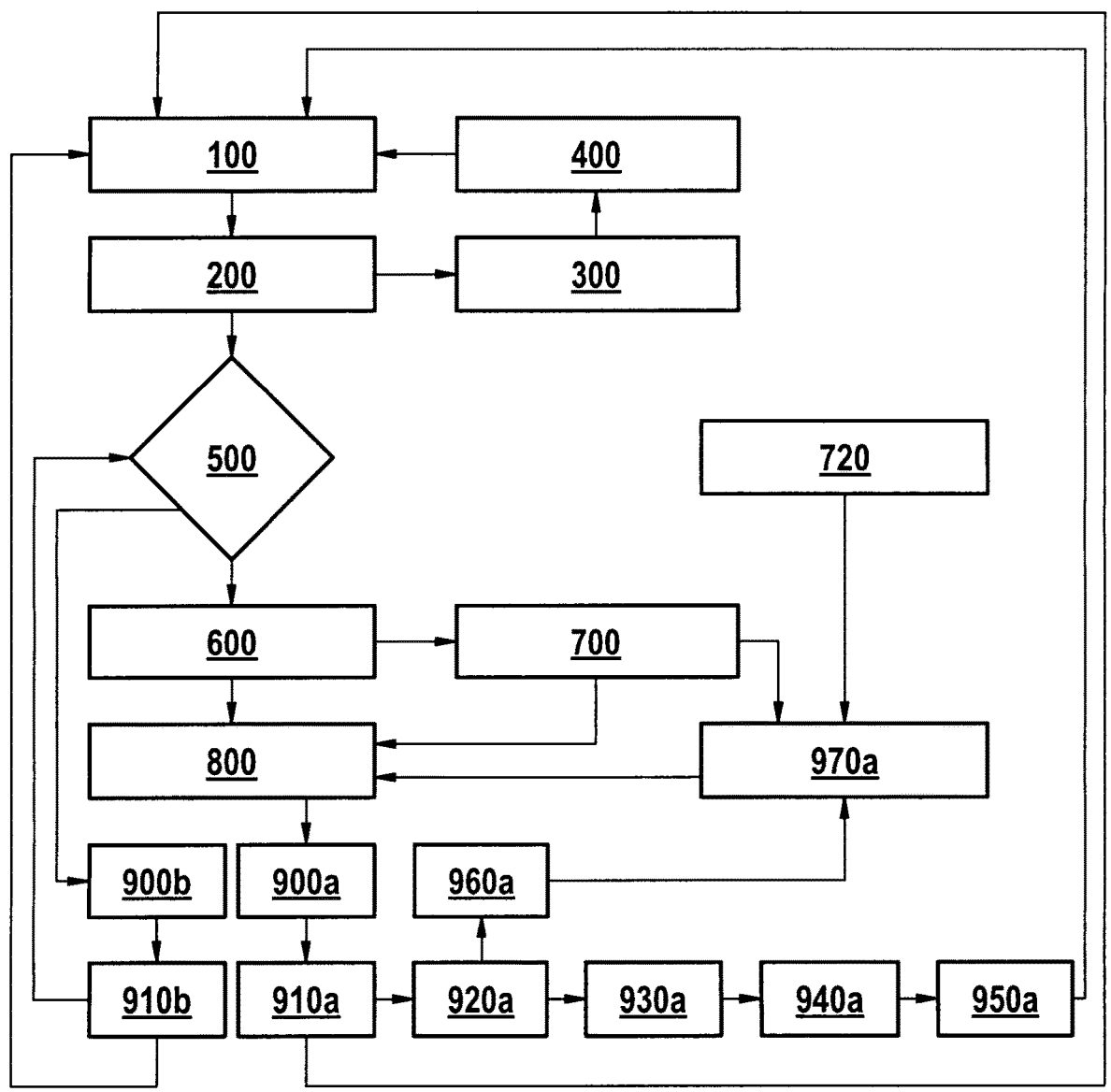
Figure 8:
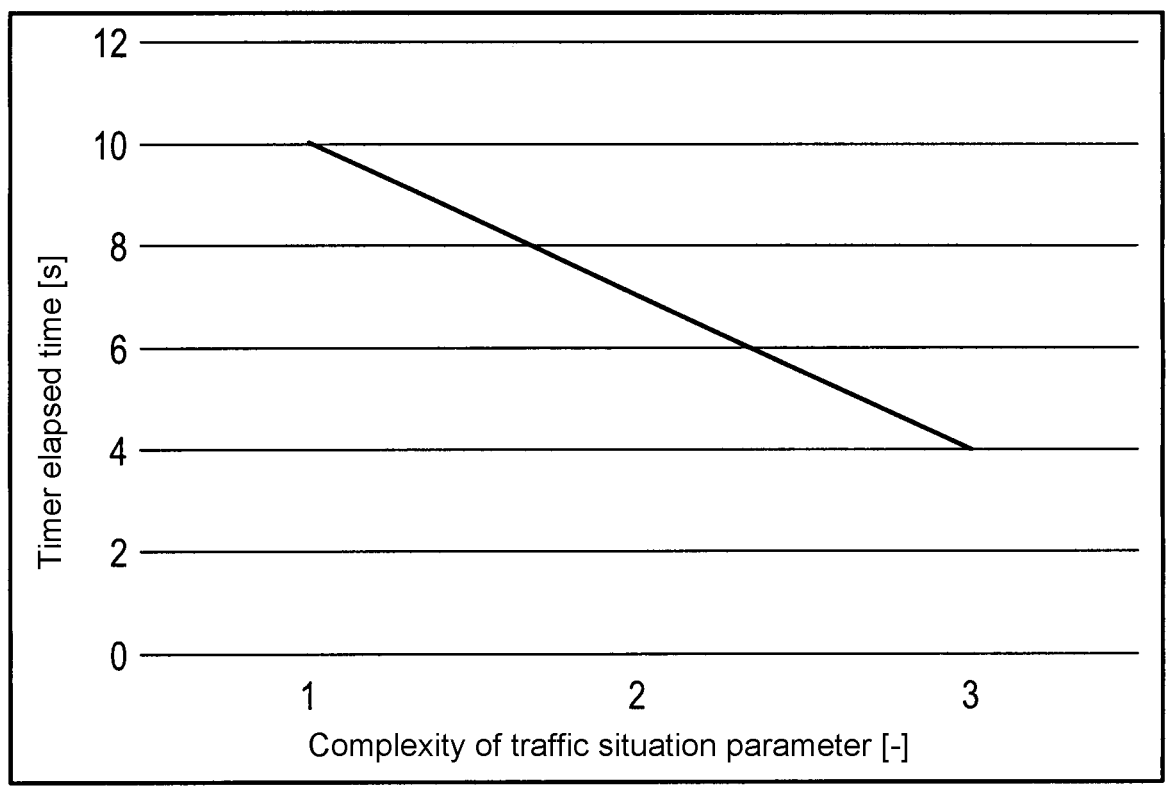
Figure 9:
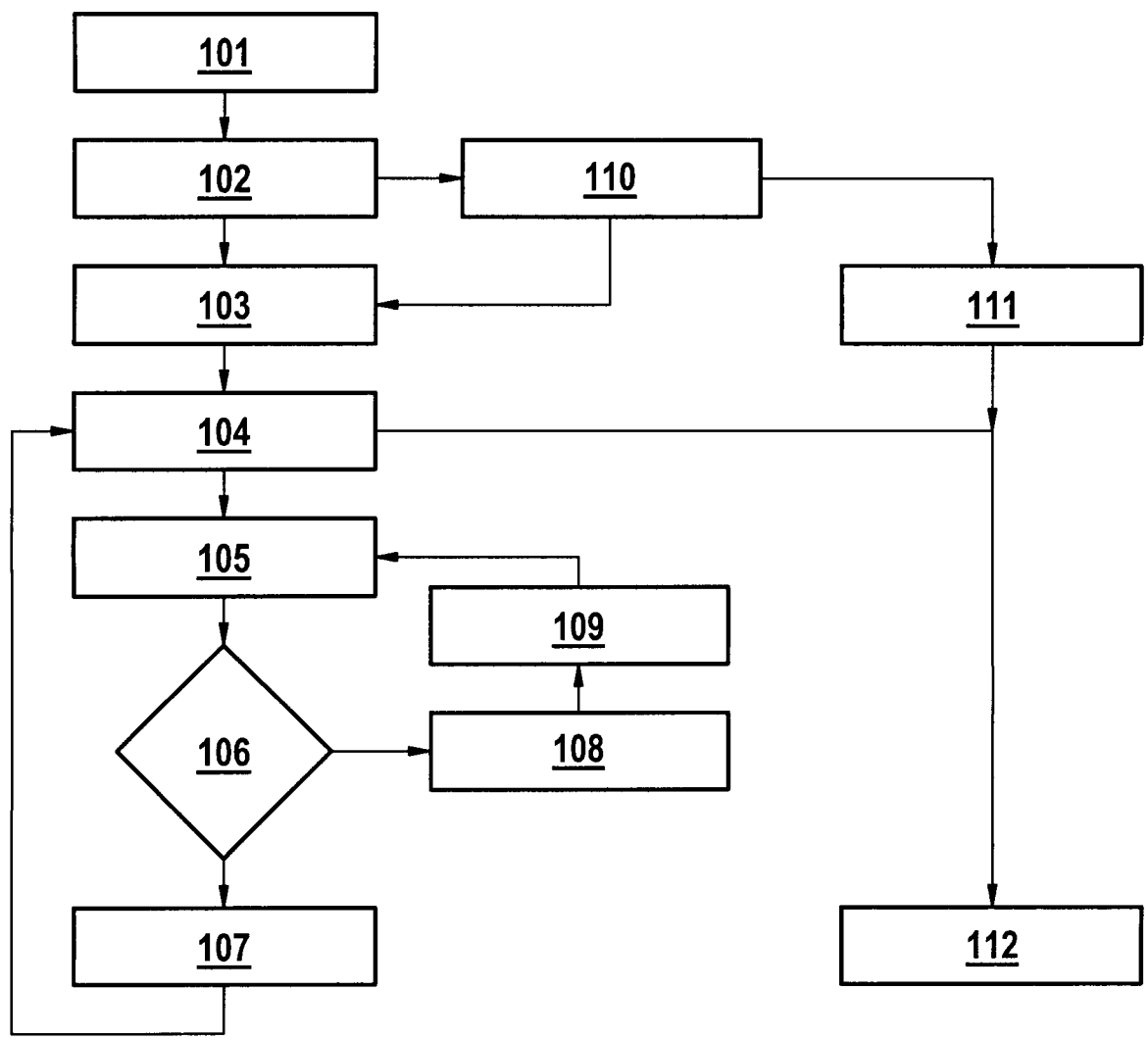

Embodiment examples of the invention are explained in greater detail below on the basis of the schematic drawing, wherein:

FIG. 1 shows a top view of a vehicle on a road without oncoming traffic and without a narrow passage, wherein the roadway width is continually measured by the vehicle, FIG. 2 shows a top view of the vehicle in accordance with FIG. 1 on a further section of the road having a narrow passage without oncoming traffic, wherein a parameter of the constriction is saved by the vehicle, FIG. 3 shows a top view of an enlarged detail of the section of the road in accordance with FIG. 2, wherein the vehicle has already driven into the narrow passage, FIG. 4 shows a top view of the vehicle in accordance with FIG. 1 within a narrow passage looking for a parking space, FIG. 5 shows a top view of the road section with the vehicle in accordance with FIG. 4 during the measuring of a distance from a detected parking space, FIG. 6 shows a top view of the vehicle in accordance with FIG. 1 on a further section of the road having a narrow passage with oncoming traffic, FIG. 7 shows a flowchart of a method for the autonomous driving of the vehicle e.g. on the road section in accordance with FIG. 6, FIG. 8 shows a complexity range of values diagram in connection with the method in accordance with FIG. 7, and FIG. 9 shows a flowchart in order to vary a range of values in connection with the method in accordance with FIG. 7.

FIG. 1 shows a vehicle 1, e.g. a car, wherein the vehicle 1 is autonomously driving on a right traffic lane 2 or respectively a right lane of a road 3 with a further left traffic lane 4 or respectively a further left lane. The vehicle 1 has sensors, e.g. a camera, a radar or an extremely accurate map and a GPS system, with which it continually monitors the width of the road 3. Provided that the road 3 is wide enough that the vehicle 1 and a possibly approaching oncoming vehicle (see FIG. 6) can pass next to one another in opposite directions on the road 3, no action for avoiding a congestion situation is necessary.

FIG. 2 shows the vehicle 1 from FIG. 1 on a further section of the road 3 in accordance with FIG. 1, on which it detects during the continual monitoring of the width of the road 3 a narrow passage 5 which is caused by multiple vehicles 6 parked behind one another on the right lane 2, only one of which is provided with a reference numeral ("6") for the sake of better clarity. According to a trajectory 7 which is predefined for the vehicle 1, the vehicle 1 must pass through the narrow passage 5 on the left lane 4. The vehicle 1 checks by means of its sensors whether an approaching oncoming vehicle on the left traffic lane 4 is heading its way in a region in front 8. If so, the vehicle 1 will wait and monitor the situation before the narrow passage 5. If not, it will save an accurate position of the start 9 of the narrow passage 5 and can constantly determine the current clearance from the start 9 of the narrow passage 5 by comparing it with its current position. The start 9 of the narrow passage 5 can serve the vehicle 1 as an avoiding position or respectively stopping position, in order to make it possible for potential oncoming traffic to pass through the narrow passage 5. For example, the vehicle 1 can stop or park behind the rearmost of the vehicles 6. In addition, the vehicle 1 monitors the traffic behind and checks whether the traffic direction on its side allows reversing.

FIG. 3 shows the vehicle 1 while it is in the process of passing through the narrow passage 5, wherein it monitors the region in front 8 of and the region behind 10 the vehicle 1 by means of its sensors. In particular, the vehicle 1 senses by means of its sensors whether at least one following vehicle is located behind the vehicle 1, wherein the following vehicle prevents or respectively blocks the vehicle 1 from reversing out of the narrow passage 5. Furthermore, the vehicle 1 determines its current clearance a from the start 9 of the narrow passage 5 by comparing its current position (e.g. determined by means of a navigation system) with the saved position of the start 9 of the narrow passage 5. Provided that—as shown by FIG. 3—no oncoming traffic and no following vehicles are detected by means of the sensors, the vehicle 1 drives in its backward direction autonomously out of the narrow passage 5. Provided that passing of oncoming traffic blocking the narrow passage 5 (indicated by a rectangle 13 which is shown dashed in the region in front 8 of the vehicle 1) is detected, but no following vehicles are present or respectively detected, the vehicle 1 drives in its forward direction autonomously out of the narrow passage 5. In addition, the vehicle 1 saves further surroundings parameters such as possible sharp bends, gradients or other possible obstacles. In other words, the vehicle 1 performs distance measurements for autonomous driving within the narrow passage 5, monitors both the route driven 10 and the route before it 8 and saves striking traffic difficulties (bends, narrow passages in the narrow passage, sections which are difficult to see, etc.).

FIG. 4 shows the vehicle within a narrow passage 5 which is similar to the narrow passage 5 in accordance with FIG. 2, but which has a parking space 12 within the narrow passage 5 between the vehicles 6 causing the narrow passage 5, wherein the parking space 12 is sufficiently large that the vehicle 1 can park in it autonomously. As is clear from FIG. 4, the vehicle 1 monitors, e.g. by ultrasound, radar and/or a camera, its "original" lane, that is to say the right lane (on which it actually wants to drive, but cannot because of the vehicles 6) and looks for parking spaces 12 in this case in the surrounding area 11 on the right in the region in front 8 of and also in the region behind 10 the vehicle 1. In this case, the vehicle 1 only selects those parking spaces into which it could also drive, which are therefore large enough to park. If the vehicle 1 has detected such a parking space 12, it "inserts a new anchor", i.e. it determines the precise position of the parking space 12 and saves it as a new avoiding position or respectively stopping position (for the start 9 of the narrow passage 5 which is further back in the region behind 10 the vehicle). In other words, the vehicle 1 makes a note of the parking space 12 as a stopping or respectively parking possibility as an alternative to the start 9 of the narrow passage 5. This is in particular advantageous if the vehicle 1 has detected a following vehicle 14 (indicated by a rectangle which is shown dashed in the region behind 10 the vehicle 1) by means of its sensors.

FIG. 5 shows the vehicle 1 during the measuring or respectively determining of a distance b between its current position and the position of the parking space. It is possible to dispense with the calculation of the larger clearance a compared therewith between the current position of the vehicle 1 and the position of the start of the narrow passage, or respectively this distance can be deleted.

FIG. 6 shows the vehicle 1 when it is passing through a further narrow passage 5 on the road 3, wherein an oncoming vehicle 13 approaching the vehicle 1 is detected by means of the sensors of the vehicle 1. The vehicle 1 determines the speed and optionally also the acceleration (negative/positive) of the oncoming vehicle 13. The problem arises that the vehicle 1 and the oncoming vehicle 13 cannot pass through the narrow passage 5 next to each other at the same time on the left lane 4 in their respective forward motions.

The vehicle 1 can access a database, in which a right-of-way rule is stored, which the driver assistance system of the vehicle 1 applies to the existing situation and concludes that the oncoming vehicle 13 has the right of way, since the obstacle causing the narrow passage 5 (in this case the vehicles 6 parked behind one another on the right lane) is located on the lane 2 of the vehicle 1. On the basis of at least the determined speed (and optionally also the acceleration) of the oncoming vehicle 13, the driver assistance system of the vehicle 1 furthermore predicts a reaction of the oncoming vehicle 13, for example in the situation shown by way of example, that the oncoming vehicle 13 is continuing its forward motion in order to pass through the narrow passage 5. Under these conditions, the driver assistance system will instruct the vehicle 1 to adjust its movement through the narrow passage 5 and to stop.

In order to solve the traffic situation shown by FIG. 6, the vehicle 1 looks for parking spaces 12 on the right lane 2, which are located before the oncoming vehicle 13. Provided that a sufficiently large parking space 12 for parking the vehicle 1 has been found, the vehicle 1 can autonomously park in this parking space 12, monitor the narrow passage 5 as well as the movement of the oncoming vehicle 13 there by means of the sensors of the vehicle 1, move out of the parking space 12 again as soon as the oncoming vehicle 13 is no longer blocking the narrow passage 5 for the passage of the vehicle 1 and pass through the narrow passage 5. If no parking space or no sufficiently large parking space is detected, the vehicle 1 can also reverse out of the narrow passage 5 again and wait behind the rearmost of the vehicles 6 until the oncoming vehicle 13 has passed through the narrow passage 5 and then pass through the narrow passage 5 itself.

FIG. 7 shows an embodiment of a method according to the invention for the autonomous driving of the vehicle in accordance with FIG. 1 through a narrow passage, e.g. the narrow passage in accordance with FIG. 6. As described in connection with FIG. 6, a right-of-way rule for the narrow passage is stored in a database, which the vehicle can access, and the narrow passage is sensed by means of sensors of the vehicle. In step 100 it is checked by means of the sensors of the driving vehicle whether an oncoming vehicle approaching the vehicle is located in the region of the narrow passage and—provided that an oncoming vehicle has been detected—in step 200 it is determined by means of the sensors whether the oncoming vehicle is already located within the narrow passage, wherein in particular a further acceleration of the vehicle can be prevented in order to increase the traffic safety and to observe traffic regulations. A driver assistance system of the vehicle applies the right-of-way rule to the existing situation and concludes that the oncoming vehicle has the right of way, as the obstacle causing the narrow passage as shown by FIG. 6 is located on the lane of the vehicle.

If the check in step 200 indicates that the oncoming vehicle is not located within the narrow passage, the vehicle is brought to a stop in step 300 before the narrow passage, where it waits and both the narrow passage and the oncoming vehicle are monitored. In this case, the vehicle checks whether or not the oncoming vehicle will block the narrow passage, e.g. because it has already passed through the narrow passage due to a right of way, has left it again by reversing, has parked in a parking space within the narrow passage or has left the narrow passage by means of a turn-off within the narrow passage. Provided that this check indicates that the oncoming vehicle will not block the narrow passage, the vehicle continues its journey in step 400 and starts again in step 100 with the check whether an oncoming vehicle approaching the vehicle is located in the region of the narrow passage—provided that an oncoming vehicle has been detected—and it is determined in step 200 by means of the sensors whether the oncoming vehicle is already located within the narrow passage.

The respective oncoming vehicle can likewise be a vehicle, which can drive autonomously by means of the method according to the invention, so that the described method steps can also be performed similarly with the oncoming vehicle. However, the method can also be applied if only the vehicle can drive autonomously according to the invention and the oncoming vehicle cannot drive autonomously.

If the check in step 200 indicates that the oncoming vehicle is already located within the narrow passage, it is concluded that the narrow passage is blocked by the oncoming vehicle for a passage of the vehicle. In this case, the vehicle is stopped in step 500 and the speed of the oncoming vehicle is measured. Provided that it is indicated that the oncoming vehicle is stationary, i.e. a speed of "zero" is determined, in step 600 a parameter of a traffic situation or respectively the complexity thereof is determined or called up. In accordance with the established parameter, a range of values is specified in step 700, which defines a maximum timer run down time. In particular, a higher complexity can result in a smaller range of values or respectively a lower maximum timer running time, whereas a lower complexity can result in a larger range of values or respectively a higher maximum timer running time.

FIG. 8 illustrates the connection between the parameter of the complexity of the traffic situation (dimensionless; x-axis) and the range of values of the timer or respectively the maximum timer elapsed time in seconds (y-axis). The parameter can, for example, be specified as being relatively high, provided that following vehicles are located behind the vehicle, which can only reverse or turn with difficulty, which corresponds to a relatively high complexity of the traffic situation (value "3" on the x-axis). A range of values from 0s to 4s, that is to say a maximum timer run-down time of 4s, is allocated to the parameter 3 on the x-axis. The parameter can also be specified as being relatively low (value "1" on the x-axis), if e.g. a free parking possibility exists within the narrow passage in the proximity of the vehicle, which corresponds to a relatively low complexity of the traffic situation. A range of values from 0s to 10s, that is to say a maximum timer rundown time of 10s, is allocated to the parameter 1 on the x-axis. An average parameter value "2" on the x-axis can e.g. then be specified, provided that sections which are difficult to see are located to the rear of the vehicle, which corresponds to a medium complexity of the traffic situation. A range of values from 0s to 7s, that is to say a maximum timer elapsed time of 7s, is allocated to the parameter 2 on the x-axis.

According to FIG. 7, a number of seconds is selected from the specified range of values, e.g. 0s to 4s, in a next step 800, for each random decision, e.g. 3s, and a timer is started, which runs depending on the chosen number of seconds, e.g. 3s. To put it simply, a problem is consequently detected, a situation is established, a situation-specific range of values is specified and a random number is chosen.

After the timer has run down, the vehicle resumes its journey in step 900*a* in order to pass through the narrow passage and checks in step 910*a* by means of the sensors whether the situation has been solved, in particular whether the oncoming vehicle is also moving forwards and, as a result, the narrow passage continues to be blocked or not by the oncoming vehicle. If the check indicates that the situation has been solved, the method is run through again, starting at step 100, by continuing or respectively resuming the journey of the vehicle.

If, however, the check in step 910*a* indicates that the situation has not been solved, e.g. because the vehicle ascertains by means of its sensors that the oncoming vehicle is moving forwards, it is checked by means of the sensors in step 920*a* whether the vehicle can park in an available parking space within the narrow passage. If so, the vehicle parks in the parking space in step 930*a*. From the parking space, the vehicle monitors the narrow passage and the oncoming vehicle by means of its sensors in step 940*a*. As soon as the vehicle ascertains in this case that the oncoming vehicle is no longer blocking the narrow passage for the passage of the first vehicle, the vehicle moves out of the parking space in step 950*a* and the method is run through again, starting at step 100, by continuing the journey of the vehicle.

In particular, if the method according to FIG. 7 is applied both to the vehicle and to the oncoming vehicle and the check under 920*a* indicates that a parking space is not available either for the vehicle or the oncoming vehicle, the vehicle and the oncoming vehicle stop in step 960*a*, its range of values or respectively timer elapsed times are increased in step 970*a* by a specifiable number of seconds, e.g. by a second, and the method is run through again, starting from step 800, wherein the vehicle and the oncoming vehicle can reciprocally measure the speed of the other vehicle in each case. The range of values can also be increased by a second if both vehicles detect that the other vehicle is setting off (again) in each case. In such a case, the vehicles stop and the range of values is then increased. By increasing the timer elapsed time, the probability is reduced that the vehicle and the oncoming vehicle will start again at the same time. Provided that the oncoming vehicle then sets off again earlier than the vehicle, e.g. in step 900*a*, the vehicle can initiate and cause reversing, park in the last detected parking space (if detected) or leave the narrow passage again by reversing, wherein it monitors the oncoming vehicle. On the other hand, should it observe that the oncoming vehicle is moving into a parking space or is leaving the narrow passage, for its part, by reversing, the vehicle can continue its forward journey.

If, in step 500, a negative speed of the oncoming vehicle is determined, it is concluded from this that the oncoming vehicle is reversing, and the narrow passage is freed for the passage of the vehicle. In this case, the vehicle continues its journey in step 900*b* and checks in step 910*b* by means of the sensors whether the situation has been solved, in particular whether or not the narrow passage is blocked by the oncoming vehicle. If this check indicates that the situation has not been solved, the method is run through again, starting from step 500. If the check indicates that the situation has been solved, the method is run through again, starting from step 100, by continuing the journey of the vehicle.

FIG. 9 shows how in another embodiment of the method according to the invention a range of values can be altered, in order to be able to avoid a permanent congestion situation. In this case, a range of values is defined in a step 101, e.g. as described in connection with FIGS. 7 and 8. In a following step 102 it is checked whether a renewed congestion situation exists with the same oncoming vehicle. If the result of this check is negative, a default value is chosen in step 103 and it is checked in step 104 whether parameters of a complexity of a traffic situation (cf. FIGS. 7 and 8) are available. If not, the method is continued with step 112, wherein a random value is selected from the range of values. If so, a parameter of a complexity of a traffic situation is evaluated in step 105, e.g. as shown by FIGS. 7 and 8. It is subsequently checked in step 106 whether or not the present situation makes further driving of the vehicle in the forward direction or in the backward direction difficult. If not, the range of values is increased in step 107 and the method is run through again, starting from step 104. If so, it is checked in step 108 whether the current range of values is greater than 1s. If so, the range of values is reduced in step 109 and the method is run through again, starting from step 105.

Provided that the result of the check in step 102 is positive, it is checked in step 110 whether modified parameters exist since a last evaluation. Provided that this is the case, the method is continued with step 103. Provided that this is not the case, the range of values is increased in step 111 and a random value is selected from the range of values in step 112.

LIST OF REFERENCE NUMERALS

1 Vehicle
2 Right lane

3 Road
4 Left lane
5 Narrow passage
6 Parked vehicles
7 Trajectory
8 Region in front of the vehicle
9 Start of the narrow passage
10 Region behind the vehicle
11 Right surroundings of the vehicle
12 Parking space
13 Oncoming vehicle
14 Following vehicle

The invention claimed is:

1. A method of autonomously driving a subject vehicle through a narrow passage, comprising:
sensing the narrow passage and an oncoming vehicle approaching in a region of the narrow passage by sensors of the subject vehicle,
determining a speed of the oncoming vehicle from speed data sensed by the sensors,
predicting a reaction of the oncoming vehicle dependent on the determined speed of the oncoming vehicle, and
autonomously moving the subject vehicle through the narrow passage, provided that:
the predicted reaction of the oncoming vehicle indicates that the oncoming vehicle will not pass through the narrow passage or will free the narrow passage, or
the subject vehicle accesses a right-of-way rule stored in a database and the right-of-way rule indicates that the subject vehicle has right-of-way in the narrow passage.

2. The method according to claim 1, further comprising:
determining and storing a position of a start of the narrow passage,
determining a current position of the subject vehicle within the narrow passage,
determining a spacing distance of the current position from the position of the start of the narrow passage,
sensing by the sensors whether at least one following vehicle is located behind the subject vehicle, wherein the following vehicle prevents the subject vehicle from reversing out of the narrow passage, and
autonomously moving the subject vehicle out of the narrow passage in a backward direction of the subject vehicle, when:
the predicted reaction of the oncoming vehicle indicates that the oncoming vehicle will pass through the narrow passage or will not free the narrow passage, or the subject vehicle accesses the right-of-way rule stored in the database and the right-of-way rule indicates that the subject vehicle does not have right-of-way in the narrow passage, and
no said following vehicle was sensed behind the subject vehicle.

3. The method according to claim 1, further comprising:
sensing a stopping place within the narrow passage by the sensors during the moving of the subject vehicle through the narrow passage, wherein the stopping place is sufficiently large for parking the subject vehicle,
determining and storing a position of the sensed stopping place,
sensing by the sensors whether at least one following vehicle is located behind the subject vehicle, wherein the following vehicle prevents the subject vehicle from reversing out of the narrow passage, and
autonomously parking the subject vehicle in the stopping place, when the predicted reaction of the oncoming vehicle indicates that the oncoming vehicle will pass through the narrow passage or will not free the narrow passage, or the subject vehicle accesses the right-of-way rule stored in the database and the right-of-way rule indicates that the subject vehicle does not have right-of-way in the narrow passage.

4. The method according to claim 1, further comprising:
establishing a parameter of a complexity of a traffic situation in the region of the narrow passage when the determined speed of the oncoming vehicle indicates that the oncoming vehicle is stationary,
specifying a range of values which defines a maximum elapsed time of a timer in seconds, dependent on the established parameter,
randomly selecting a number of seconds from the range of values, and running down the timer in accordance with the selected number of seconds,
autonomously moving the subject vehicle within the narrow passage in a forward direction of the subject vehicle after the timer has run down, and
checking by the sensors whether the narrow passage can be passed through by the subject vehicle.

5. The method according to claim 4, further comprising determining the complexity of the traffic situation in the region of the narrow passage dependent on at least one of the following criteria:
a presence of at least one following vehicle behind the subject vehicle,
a number of following vehicles present behind the subject vehicle,
a type of following vehicles present behind the subject vehicle,
a presence of a stopping place for the subject vehicle within the narrow passage, and
a complexity of the narrow passage.

6. The method according to claim 4, wherein:
the method is performed by the subject vehicle and a same method is performed by the oncoming vehicle, and
the range of values defining the maximum elapsed time of the timer is increased by at least one second, when the determination of the respective speed of the oncoming vehicle and of the subject vehicle from speed data sensed by the sensors indicates that:
the subject vehicle and the oncoming vehicle are stationary, or
the subject vehicle and the oncoming vehicle are driving in respective forward directions thereof.

7. The method according to claim 4, further comprising:
evaluating the established parameter of the complexity of the traffic situation in the region of the narrow passage and determining whether the traffic situation makes it difficult for the subject vehicle to continue moving in the forward direction thereof or in the backward direction thereof, and
increasing the range of values defining the maximum elapsed time of the timer, provided that the traffic situation makes it difficult for the subject vehicle to continue moving in the forward direction thereof or in the backward direction thereof, or
reducing the range of values defining the maximum elapsed time of the timer, provided that the traffic situation does not make it difficult for the subject vehicle to continue moving in the forward direction thereof or in the backward direction thereof.

8. The method according to claim 1, wherein the subject vehicle is autonomously moved through the narrow passage when the predicted reaction indicates that the oncoming vehicle will not pass through the narrow passage.

9. The method according to claim 1, wherein the subject vehicle is autonomously moved through the narrow passage when the predicted reaction indicates that the oncoming vehicle will free the narrow passage.

10. The method according to claim 1, wherein the subject vehicle accesses the right-of-way rule stored in the database, and the subject vehicle is autonomously moved through the narrow passage when the right-of-way rule indicates that the subject vehicle has right-of-way in the narrow passage.

11. The method according to claim 1, wherein the subject vehicle accesses the right-of-way rule stored in the database, and the subject vehicle is autonomously moved through the narrow passage when the right-of-way rule indicates that the subject vehicle has right-of-way in the narrow passage and the predicted reaction of the oncoming vehicle indicates that the oncoming vehicle will not pass through the narrow passage or will free the narrow passage.

12. A driver assistance system for a vehicle, wherein the driver assistance system is configured to execute the method according to claim 1.

13. A vehicle having the driver assistance system according to claim 12.

* * * * *